United States Patent
Koch et al.

(10) Patent No.: US 11,034,014 B2
(45) Date of Patent: Jun. 15, 2021

(54) LONG-SHAFT TOOL, SYSTEM COMPRISING A LONG-SHAFT TOOL WITH A FIRST MANIPULATOR AND A SECOND MANIPULATOR AS WELL AS USE FOR SUCH A TOOL AND SUCH A SYSTEM

(71) Applicants: Scotland Gas Networks PLC, Edinburgh (GB); Southern Gas Networks PLC, Horley (GB)

(72) Inventors: Elmar Koch, Eslohe (DE); Tobias Klein, Kirchhundem (DE); Andreas Joachim Hanses, Lennestadt (DE); Martin Köper, Attendorn (DE)

(73) Assignees: Scotland Gas Networks PLC, Newbridge (GB); Southern Gas Networks PLC, Horley (GB)

( * ) Notice: Subject to any disclaimer, the term of this patent is extended or adjusted under 35 U.S.C. 154(b) by 0 days.

(21) Appl. No.: 15/591,921

(22) Filed: May 10, 2017

(65) Prior Publication Data
US 2017/0334058 A1    Nov. 23, 2017

(30) Foreign Application Priority Data
May 19, 2016    (DE) ............... 10 2016 006 068.9

(51) Int. Cl.
*B25G 1/06* (2006.01)
*B25J 15/00* (2006.01)
(Continued)

(52) U.S. Cl.
CPC ............. *B25G 1/06* (2013.01); *B23D 21/08* (2013.01); *B25B 13/06* (2013.01); *B25B 13/481* (2013.01);
(Continued)

(58) Field of Classification Search
CPC ... B25B 23/16; B25B 13/481; B25B 13/5083; B25B 23/0007; B25B 17/00;
(Continued)

(56) References Cited

U.S. PATENT DOCUMENTS 4,218,940 A * 8/1980 Main ................... B25B 13/06
                                                  81/177.85
4,680,994 A    7/1987 Singleton
(Continued)

FOREIGN PATENT DOCUMENTS

CA    2454955 A1 *  7/2005    ............. B25B 13/06
CA    2454955 A1    7/2015
(Continued)

OTHER PUBLICATIONS

Translation of EP1847744A2 attached (Year: 2007).*
(Continued)

*Primary Examiner* — Monica S Carter
*Assistant Examiner* — Abbie E Quann
(74) *Attorney, Agent, or Firm* — Howard IP Law Group, PC

(57) ABSTRACT

A long-shaft tool includes a shaft extending along a longitudinal axis and having a handle at a first end of the shaft and a second end opposite the first end with a holder for a manipulator wherein the holder has a protruding latch pin provided for engagement with a recess of a manipulator, which can be moved from the protruding position into a retracted position. The holder has a coupling half for coupling with a coupling half of a manipulator which is rotatable relative to a base body of the shaft.

15 Claims, 15 Drawing Sheets

(51) Int. Cl.
    *B25B 13/06*     (2006.01)
    *B25B 13/48*     (2006.01)
    *B25B 15/00*     (2006.01)
    *B25B 23/00*     (2006.01)
    *B25B 17/00*     (2006.01)
    *B23D 21/08*     (2006.01)
    *B25B 9/00*     (2006.01)

(52) U.S. Cl.
    CPC ............ *B25B 15/007* (2013.01); *B25B 17/00* (2013.01); *B25B 23/0007* (2013.01); *B25B 23/0021* (2013.01); *B25J 15/0028* (2013.01); *B25B 9/00* (2013.01); *B25B 15/008* (2013.01)

(58) Field of Classification Search
    CPC ............... B25B 23/0021; B25J 15/0038; B25J 15/0028; B25G 3/26; B25G 1/06; B25G 1/063; B23D 21/08
    USPC ............................................ 81/53.1, 52, 429
    See application file for complete search history.

(56) References Cited

U.S. PATENT DOCUMENTS

| | | | |
|---|---|---|---|
| 7,347,124 | B1 | 3/2008 | Kravitch |
| 8,065,938 | B1 | 11/2011 | Kravitch |
| 2005/0229739 | A1* | 10/2005 | Steiner ................ B25B 23/0035 74/545 |
| 2008/0016636 | A1* | 1/2008 | Morris ..................... B25G 3/28 15/145 |
| 2013/0160613 | A1* | 6/2013 | Brailey .................. B25B 15/02 81/111 |

FOREIGN PATENT DOCUMENTS

| | | | |
|---|---|---|---|
| DE | 3129131 A1 | 6/1982 | |
| EP | 1847744 A2 * | 10/2007 | ............. F16L 1/032 |
| EP | 2 040 886 A2 | 4/2009 | |
| GB | 2132926 A | 5/1982 | |
| JP | 58141328 A | 8/1983 | |
| JP | 6131677 A | 2/1986 | |
| WO | 2008/010144 A2 | 1/2008 | |

OTHER PUBLICATIONS

EP1847744 Translation (Year: 2007).*
English translation of Japanese Office Action dated Oct. 1, 2018 in parallel Japanese Patent Application No. 2017-099641.

* cited by examiner

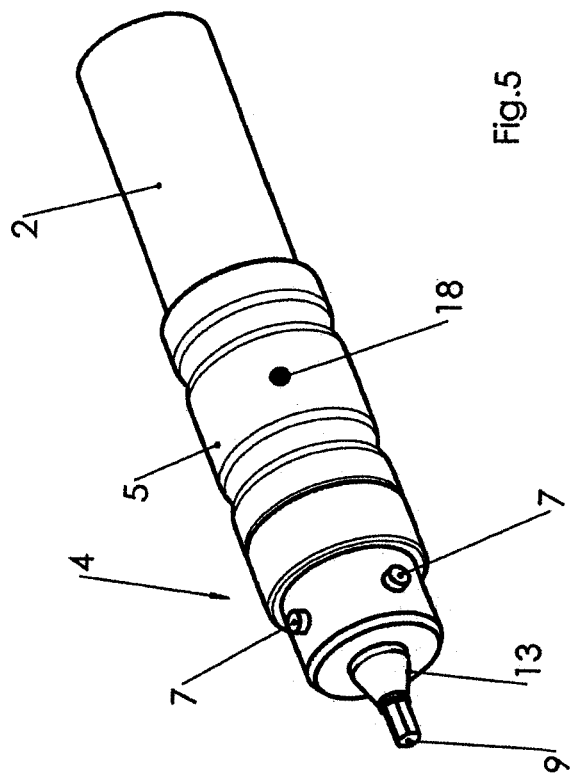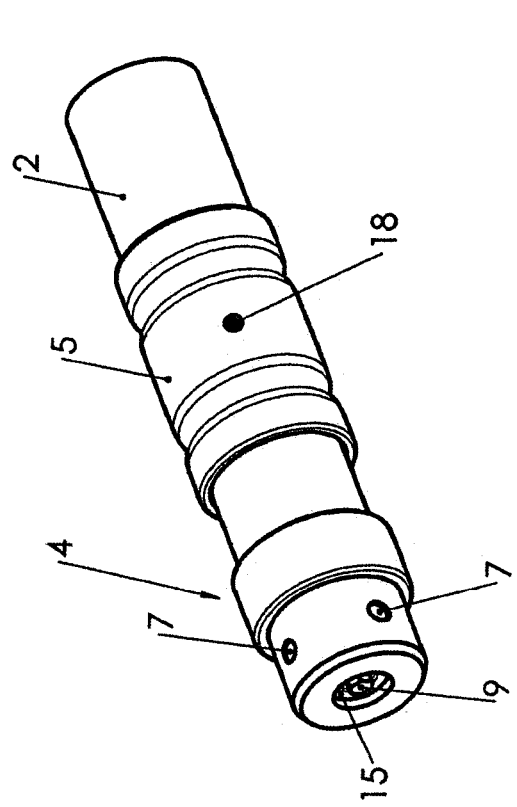

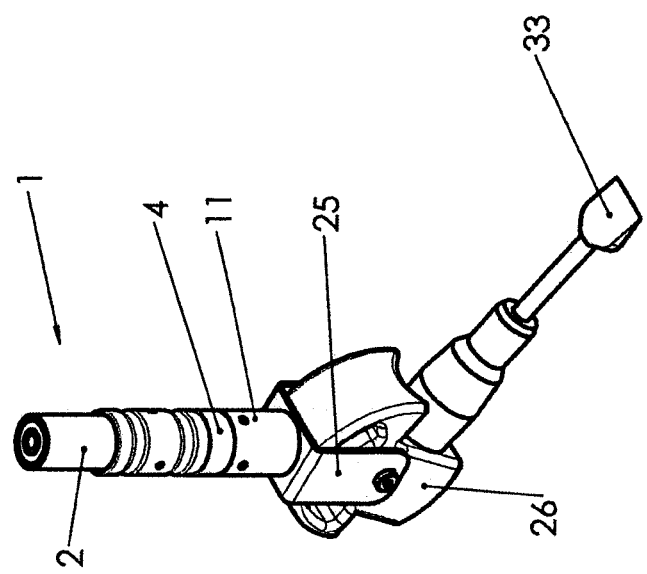
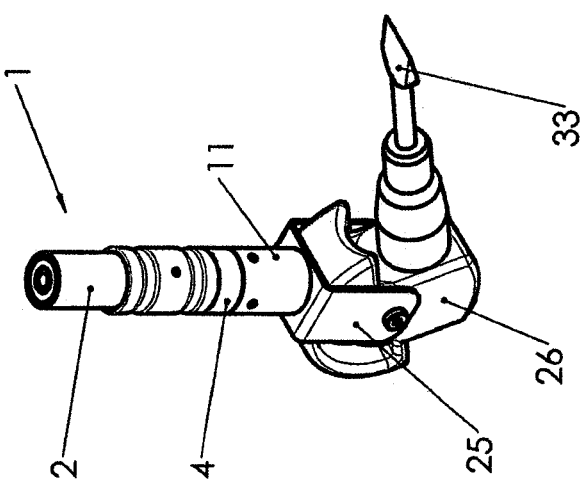

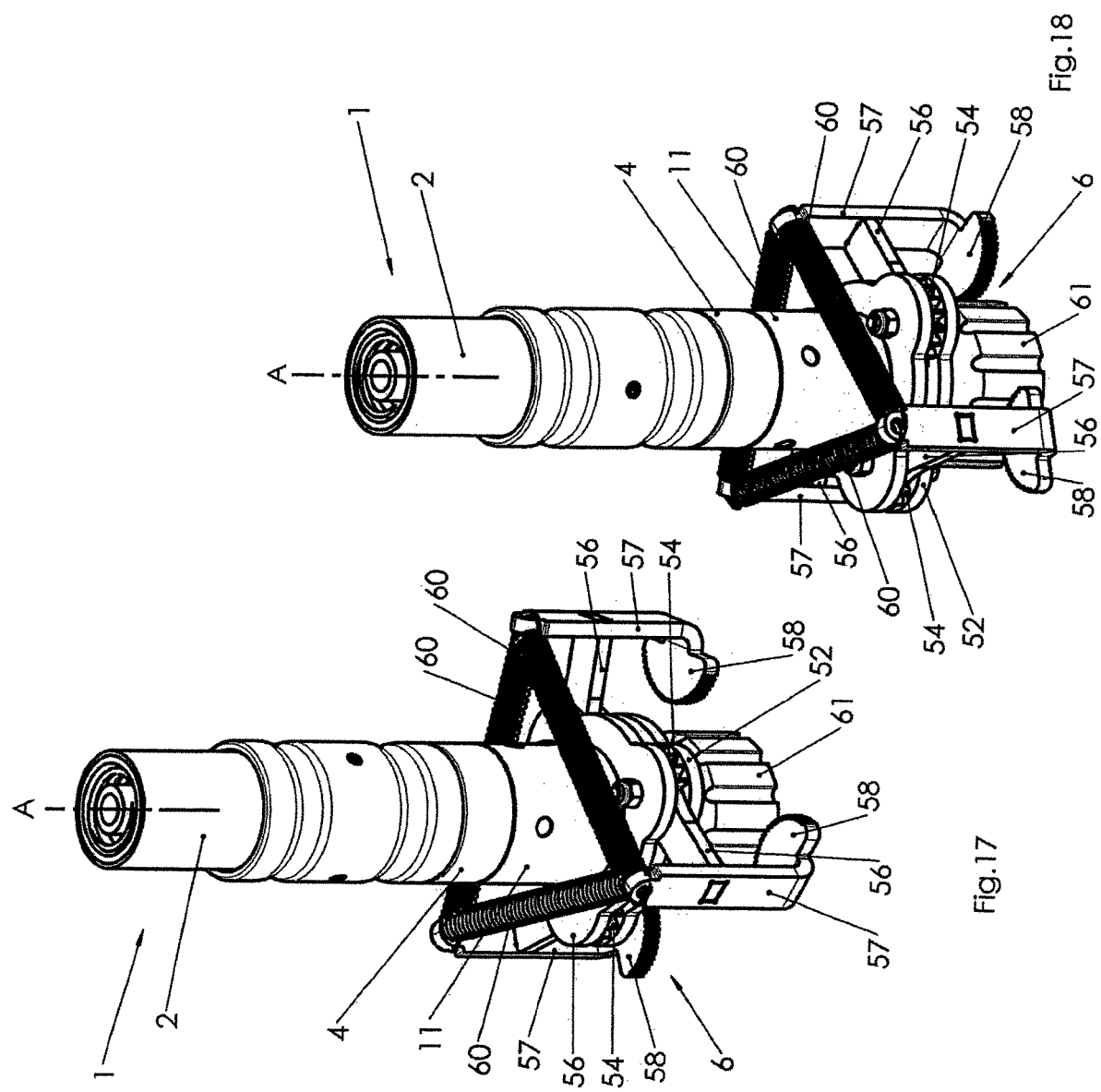

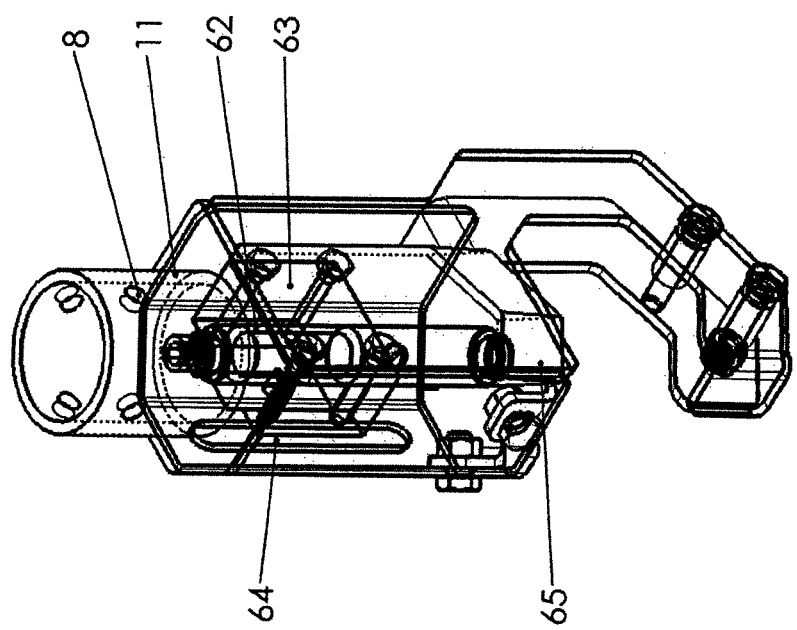

LONG-SHAFT TOOL, SYSTEM COMPRISING A LONG-SHAFT TOOL WITH A FIRST MANIPULATOR AND A SECOND MANIPULATOR AS WELL AS USE FOR SUCH A TOOL AND SUCH A SYSTEM

CROSS-REFERENCE TO RELATED APPLICATIONS

This application claims priority pursuant to 35 U.S.C. 119(a)-(d) to German Application No. 10 2016 006 068.9 filed May 19, 2016, the entire contents of which is incorporated herein by reference for all purposes.

FIELD OF THE INVENTION

The invention relates to a long-shaft tool with a shaft extending along a longitudinal axis having a handle at a first end of the shaft and a second end opposite the first end with a holder for a manipulator as well as a system comprising such a long-shaft tool and a first manipulator and a second manipulator, and also a use for such a tool or such a system.

BACKGROUND OF THE INVENTION

Known from U.S. Pat. No. 7,347,124 B1 for example is a long-shaft tool having a shaft, designated there as "longitudinal housing 47" extending along a longitudinal axis. The long-shaft tool described there has a handle in the form of the "tee handle" provided there with the reference number 28. Furthermore, at a second end opposite the first end the long-shaft tool described there has a manipulator in the form of the "tool" characterized by the reference number 30. The long-shaft tool described in U.S. Pat. No. 7,347,124 B1 is used for machining a pipeline located in a trench from the ground surface. In this context, the long-shaft tool known from U.S. Pat. No. 7,347,124 B1 has the disadvantage that only one type of manipulation, in particular machining of the pipeline located in the trench can be performed with the tool, namely that in which a manipulation surface is moved about an axis of rotation, for example, the manipulation surface of a drill tip. Other types of manipulation, for example such as that of abrasion with a fixed manipulator are not possible with the long-shaft tool known from U.S. Pat. No. 7,347,124 B1. If such manipulations are to be performed from the ground surface on a pipeline located in the trench, the operator must bring with him a plurality of long-shaft tools.

SUMMARY OF THE INVENTION

Against this background, it was the object of the invention to provide a long-shaft tool which increases the type of manipulations which can be performed with the long-shaft tool.

This object is solved by the subject matter disclosed herein. Advantageous embodiments are reproduced in the following description.

The invention starts from the basic idea of configuring the manipulator of the tool to be exchangeable, but at the same time giving it a firm seat which allows the transmission of high forces such as are required, for example, for tightening screws with a torque or for releasing caked screws but at the same time however, to provide the possibility of turning a manipulation surface of the manipulator.

For this purpose, the long-shaft tool provides a holder for a manipulator at the second end opposite the first end. The holder has a protruding latch pin provided for engagement with a recess of a manipulator, which can be moved from the protruding position into a retracted position. This latch pin enables a firm holding of the manipulator in the holder and therefore secure transmission of impact forces or of torques when the manipulator is fixed. At the same time, the long-shaft tool according to the invention provides that the holder has a coupling half for coupling with a coupling half of a manipulator wherein the coupling half is rotatable relative to a base body of the shaft. The provision of such a coupling half which is rotatable relative to the base body enables the coupling half to be turned without turning the base body. This offers the advantage that the base body and a manipulator received by the holder of the shaft are held in a position desired by the user whilst the manipulation surface which in a preferred embodiment is designed to be rotatable with respect to other parts of the manipulator can be turned without changing this alignment desired by the user of the other parts of the manipulator and the base body.

By providing a holder for the manipulator and configuring the holder with the protruding latch pin provided for engagement with a recess of the manipulator, which can be moved from the protruding position into a retracted position, in the long-shaft tool according to the invention the possibility of simply exchanging the manipulator is provided. As a result, the system according to the invention can be provided in which in a first system state a first manipulator is received by the holder and in a second system state a second manipulator instead of the first manipulator is received by the holder. The same as a tool box with different tool tips, with the system according to the invention, it will thus be possible for the operator to perform a multiplicity of manipulation activities by using a single shaft. In particular in view of the length of the shaft, this also affords transport advantages. The operator merely needs to take one long shaft to the construction site and separately the manipulators for the machining steps which he desires. On site, the operator can then equip the long-shaft tool for the respective manipulation step which he specifically requires.

The long-shaft tool according to the invention has a shaft extending along a longitudinal axis. This shaft particularly preferably has a length of more than 1 m, particularly preferably a length of more than 1.5 m and quite particularly preferably a length of more than 2 m. The length of the shaft to be selected will usually depend on the area of usage of the long-shaft tool. In a preferred embodiment the tool according to the invention is used for machining a pipeline located in a trench from the ground surface. Pipelines can particularly preferably involve supply lines for water, power, gas, district heat, communication lines such as telephone lines and waste removal lines such as, for example, sewers. These supply and removal lines are frequently laid at a depth between 0.5 m and 3 m. If the operator is to be enabled to perform a manipulation of a pipe with the long-shaft tool according to the invention whilst standing on the ground surface, the shaft will be designed to be more than 1 m, preferably more than 1.5 m longer than the distance of the pipeline located in the trench measured from the ground surface. Particularly preferably the shaft has a length of less than 15 m, particularly preferably less than 10 m, particularly preferably less than 5 m and quite particularly preferably of less than 3 m.

The tool according to the invention is particularly preferably a portable tool, therefore has a size and a weight which allow a single operator to move the tool and be able to perform manipulation actions with it, for example from the surface on a pipeline located in a trench. In particular, the shaft of the tool (i.e. the tool without a manipulator) weighs less than 50 kg, particularly preferably less than 25 kg, particularly preferably less than 10 kg and quite particularly preferably less than 5 kg and particularly preferably less than 2.5 kg. Such a weight can also be achieved with shaft lengths of 2 m or more, for example, when the base body of the shaft is made of plastic, for example, a carbon fiber composite material.

In a preferred embodiment, the shaft comprises a base body which is a hollow body, particularly preferably a tube, particularly preferably a tube having a ring-shaped cross-section, particularly preferably a tube having an annular cross-section. However, embodiments are also feasible in which a base body of the shaft configured as a tube has a rectangular, elliptical, triangular or polygonal cross-section. The base body can consist of a metal. In order to keep the shaft transportable, it is preferable if the shaft is designed to be light. In this case, however, the loadings of the shaft, in particular the need for transmission of forces through the shaft should be taken into account. Thus, cases of application are feasible in which the base body is made of aluminum. In a preferred embodiment the base body is not made of a metal. In a preferred embodiment the base body is made of plastic. In a particularly preferred embodiment the base body is made of a carbon fiber composite material.

A handle is provided at a first end of the shaft. Such a handle can be already formed by the outer surface of the shaft provided in the region of the end of the base body. In a preferred embodiment however, further elements are provided on the first end of the shaft to form the handle, such as for example projections, grip eyes, corrugated sections, surface sections with rubber coating or T-pieces or a crank.

The long-shaft tool has a second end opposite the first end. At this second end a holder is provided for a manipulator. In a preferred embodiment the holder has a cylindrical section with which it can be introduced into a correspondingly designed hollow-cylindrical section of the manipulator in order to thereby receive the manipulator. In an alternative embodiment it is feasible to configure the holder with a hollow cylindrical section into which a correspondingly shaped cylindrical section of the manipulator can be introduced in order to thereby make the manipulator be received by the holder. Instead of cylindrical cross-sections, elliptical cross-sections or polygonal, for example, triangular, rectangular or polygonal cross-sections are also feasible. Elliptical and polygonal cross-sections can facilitate the transmission of torques from the holder onto the manipulator.

The holder has at least one latch pin. The latch pin is provided for engagement with a recess on the manipulator and is configured to protrude. From the protruding position the latch pin can be moved into a retracted position. The engagement of the latch pin in the recess of the manipulator enables a secure holding of the manipulator in the holder. This secure holding which can be brought about in particular by a tight fit between the latch pin and the recess is in particular necessary when impact forces or torques must be transmitted to the manipulator via the shaft, for example, when earth is to be scraped from a pipeline by means of a manipulator configured as a scraper or when a manipulator comprising a rigid brush is used to scrape earth from the ground surface or when a manipulator having a screwdriver-like tip is used for insertion into the rotatable adjusting slot of a valve to perform an adjustment of the valve.

In a preferred embodiment the latch pin is a cylindrical element. Designs are feasible in which the latch pin relative to its longitudinal axis does not have a round cross-section but an elliptical or polygonal, for example, triangular, rectangular or polygonal cross-section. However, such cross-sections can result in canting so that a circular cross-section of the latch pin is preferred. The latch pin can be spherical at the ends since this simplifies engagement in a recess of the manipulator. In another embodiment the latch pin can be conical or frustro-conical at one end. Such embodiments also facilitate the engagement of the latch pin in a recess of the manipulator.

The latch pin is frequently used or inserted as a loss prevention device when only small torques are to be transmitted between the shaft and the manipulator via the latch pin. In such embodiments it is advantageous if the latch pin is narrow, i.e. if its longitudinal extension (extension in the radial direction relative to the longitudinal axis of the shaft) is significantly greater than its extension in a direction perpendicular therefore, for example, is 1.5 times, particularly preferably more than 1.5 times, particularly preferably more than two times greater. However, embodiments are also feasible in which higher torques should be transmitted via the latch pin from the holder to the manipulator. It can therefore be appropriate to design the latch pin as a chock whose extension perpendicular to a longitudinal axis (perpendicular to its radial extension relative to the longitudinal axis of the shaft) is greater than its longitudinal extension particularly preferably is 1.5 times, particularly preferably more than 1.5 times, and quite particularly preferably more than two times greater.

In a preferred embodiment, the long-shaft tool has at least two such latch pins, particularly preferably three, quite particularly preferably four such latch pins. The latch pins are particularly preferably distributed uniformly over the circumference of the recess. This simplifies the engagement of the latch pins in the respective recesses of the manipulator since there are several relative positions of the latch pins distributed uniformly over the circumference of the holder relative to the recesses distributed correspondingly uniformly over the circumference of the corresponding section of the manipulator. Alternatively an embodiment is feasible in which a particular alignment of the manipulator relative to the holder or relative to the shaft is important. This can be brought about when providing a plurality of pins particularly simply by distributing the pins irregularly over the circumference of the holder. Thus, for example, an embodiment can be provided in which only one relative position of the latch pins relative to the recesses is possible and it is thereby ensured that the latch pins only engage in the recesses of the manipulator when the desired relative position has been brought about.

In a preferred embodiment the latch pins are arranged on a circle about the longitudinal axis of the shaft. In a preferred embodiment, the centers of mass and/or the centroids of volume of the latch pins are arranged in one plane, particularly preferably in a plane which is perpendicular to the longitudinal axis of the shaft and quite particularly preferably arranged in a circle in such a plane whose center point lies on the longitudinal axis.

The latch pin is designed so that it can be moved from a protruding position into a retracted position. In a preferred embodiment the movement from the protruding position into the retracted position contains at least one radial component, i.e. a movement component perpendicular to the longitudinal axis of the shaft. Particularly preferably the direction of movement from the protruding position into the retracted position is radial, i.e. perpendicular to the longitudinal axis of the shaft. In the protruding position, the latch pin can be closer to the longitudinal axis of the shaft. Such an arrangement is particularly appropriate when the holder comprises a hollow cylinder into which a projection of the manipulator is inserted. In such an embodiment, the latch pin particularly preferably projects inwards and is moved away from the longitudinal axis of the shaft during the movement into its retracted position. In an alternative embodiment the protruding position of the latch pin is further away from the longitudinal axis of the shaft than the retracted position. Such an embodiment is particularly appropriate when the manipulator comprises a hollow-cylindrical section which is pushed onto a holder designed as a projection. In such an embodiment the latch pin particularly preferably projects radially outwards in its protruding position and is moved towards the longitudinal axis during its movement into the retracted position.

In a preferred embodiment a latch pin holder is provided which receives a part of the latch pin. Such a holder can, for example, be chock-shaped or part of an expanding cone. Particularly preferably the latch pin is held firmly in the latch pin holder, particularly preferably firmly with respect to translational relative movements and/or firmly with respect to rotational relative movements relative to the latch pin holder. The provision of a latch pin holder simplifies the transmission of movements to the latch pin, particularly preferably the retraction of the latch line when resilient elements should be provided for this.

In addition to the latch pin, the holder of the long-shaft tool according to the invention has a coupling half for coupling to a coupling half of a manipulator which is rotatable relative to the main body. The tool according to the invention enables embodiments to be provided by the latch pins of the holder in which a rotational movement of the base body is transmitted into a rotational movement of the manipulator. The invention could however increase the area of application of the tool and equip the tool for performing manipulations in which the base body is mot moved rotationally and only the manipulator or at least one manipulation surface of the manipulator should be moved rotationally. For this purpose the invention provides the coupling half of the holder which is rotatable relative to the base body. A friction disk can be provided as coupling half which cooperates with a correspondingly designed friction disk of a manipulator so that the rotation of the friction disk of the holder is transmitted into a rotation of the friction disk of the manipulator. Thus, the coupling can be a frictionally engaged coupling. Particularly preferred however is a positive locking coupling. For this purpose the coupling half can for example be a polygonal chock, for example, a square chock, a pentagonal chock or a hexagonal chock and the other coupling half can be executed as a square, particularly preferably pentagonal, particularly preferably hexagonal correspondingly designed recess. The coupling can be configured as a claw coupling or as a spur toothing or for example as a magnetic coupling.

In a preferred embodiment the coupling half of the holder is designed concentrically with the longitudinal axis of the shaft. In a preferred embodiment with several latch pins which are arranged on a circle around the longitudinal axis of the shaft, the coupling half of the holder is arranged inside the circle.

In a preferred embodiment, the latch pin is moved radially in relation to the longitudinal axis for adopting the retracted position. In a particularly preferred embodiment, a cone element is provided whose cone surface can be brought in contact with one end of the latch pin or in contact with one latch pin holder which receives one end of the latch pin, wherein a sliding of one end of the latch pin or the latch pin holder along the cone surface brings about a change in the radial position of the latch pin relative to the longitudinal axis. Particularly preferably the cone surface is movable in the direction of the longitudinal axis or in a direction parallel to the longitudinal axis relative to the latch pin. If the cone surface is now moved in the direction of the longitudinal axis or in a direction parallel to the longitudinal axis of the shaft, the end of the latch pin slides or the holder slides along the cone surface. It can hereby be achieved that merely by displacing the cone surface in the direction of the longitudinal axis or in a direction parallel to the longitudinal axis of the shaft, the radial position of the latch pin can be adjusted. A sawtooth-profile-like or ratchet-like geometry running in the circumferential direction is feasible as an alternative. Turning such a geometry about the longitudinal axis of the shaft has the effect that sloping surfaces can be turned about the longitudinal axis of the shaft. If these sloping surfaces come in contact with the end of the latch pin or with the holder, such a movement can also bring about a sliding of the end of the latch pin or the holder along the sloping surface to a change in the radial position of the latch pin relative to the longitudinal axis.

In a preferred embodiment, a cone element spring is provided which is tensioned when the cone element is moved from a preferred position into a different position. In a preferred embodiment the cone element can be moved in the direction of the longitudinal axis or in a direction parallel to the longitudinal axis. In a preferred embodiment the preferred position of the cone element is selected so that in the preferred position of the cone element the latch pin of the holder is in the protruding position. As a result of the cone element spring, the cone element adopts this preferred position when no forces are applied which move the cone element from the preferred position. This means that in the forceless state the cone element adopts the preferred position. This offers advantages with regard to the securing of the manipulator in the holder. Thus, the manipulator is held securely in the holder by the protruding latch pins until a force is actively applied which moves the cone element from the preferred position into a different position. In a particularly preferred embodiment the cone element spring pretensions the cone element in its preferred position against a projection. The cone element spring can be designed as a helical spring. In a preferred embodiment the cone element spring, particularly preferably when it is designed as a helical spring, is disposed inside the base body. For example, it is feasible that the helical spring abuts with one end against a projection, particularly preferably a ring-shaped projection which projections inwards from the inner surface of a tubular base body of the shaft. In such an embodiment the opposite end of the helical spring can abut against the cone element or abut against a spring which is provided on an outer surface of the element, for example, an inner tube which is connected to the cone element, for example, when the cone element is provided at the tip of an inner tube.

In a preferred embodiment the cone element is provided on a pipe that is disposed in the base body or is provided on a rod which is disposed in the base body. As a result, an element moving the cone element, for example, the pipe or the rod can be protected by the base body of the shaft.

In a preferred embodiment the cone element is followed by a cylindrical element, in particular at the wider end of the cone element. An embodiment is thereby created in which a sliding of the end of the latch pin or the holder along the cone surface brings about a change in the relative position of the latch pin relative to the longitudinal axis and the latch pin in this changed radial position then reaches the outer surface of the cylindrical element. This allows a further translational movement of the cone element or a pipe or rod carrying the cone element relative to the end of the latch pin or the holder without the radial position of the latch pin being changed. Such an embodiment is particularly suitable when the cone element and the coupling half of the holder belong to a cohesive assembly. If the coupling half of the holder is moved translationally for cooperating with the coupling half of the manipulator, the cone element is also moved translationally. After the coupling half has come into engagement, it can be desired to move the coupling halves further translationally without changing the radial position of the latch pin. For example, this takes place in embodiment in which by rotation of the coupling half of the manipulator, a screw is to be screwed into a holder of the manipulator. During screwing in, the axial position of the screw changes so that the coupling halves should be designed to be translationally displaceable but at the same time, the radial position of the latch pin should not be changed. This circumstance can be taken into account by providing a cylindrical element at the end of the cone element.

In a preferred embodiment, the tool has a handle surface at the first end through the movement of which the pipe or the rod can be moved translationally and/or rotationally inside the base body. This handle surface can be a surface section of the pipe or the rod, for example, if a section of the pipe or a section of the rod projects from the base body of the shaft at the first end. In a preferred embodiment however, the handle surface is part of a handle formed on the pipe or on the rod at the first end. For example, the pipe or the rod can have a T-shaped handle at the first end. Likewise a head- or mushroom-shaped handle is feasible at the end of the pipe or the rod in the region of the first end of the shaft. Likewise, a crank can be formed at the end of the pipe or the rod.

In a preferred embodiment the pipe disposed in the base body of the shaft or the rod disposed in the base body of the shaft are guided by guides in the base body. For example, at the end of the base body lying closest to the first end of the shaft, a closure element can be provided (for example, as end cap) which closes the base body at this end but which at the same time functions as a guide for the pipe or the rod. Furthermore it is feasible that additional disk-like guide elements are provided inside the base body which are gripper by the pipe or the rod and thus guide this inside the base body of the shaft.

In a preferred embodiment a handle surface is provided at the second end of the shaft through the movement of which the pipe or the rod can be moved translationally or rotationally inside the base body. Such a handle can be formed by the outer surface of the shaft already provided in the region of the second end of the base body. In a preferred embodiment however, further elements are provided at the second end of the shaft to form the handle such as, for example, projections, handle eyes, corrugated sections, surface sections with rubber coating.

Particularly preferably however the handle surface is at the second end of the shaft is arranged on a slider which is located on the outside on the base body of the shaft. This slider can be moved translationally and/or rotationally relative to the base body of the shaft. The slider can also have a driver which passes through the outer wall of the base body of the shaft, for example, engages in an elongate hole which is provided on the outer circumference of the base body of the shaft. The elongate hole can extend parallel to the longitudinal axis but can also run at an angle thereto. The driver can be connected directly to the pipe or the rod so that a movement of the slider via the driver is transmitted directly into a movement of the pipe or the rod. Likewise it is feasible that the driver contacts a projection on the pipe or on the rod and via this contact transmits a movement of the slider to the pipe or he rod. In a preferred embodiment the driver acts on one side on a projection on the pipe or the rod whilst when viewed in the longitudinal direction of the shaft on the other side of the projection a helical spring is in contact with the projection which tensions the pipe or the rod into a preferred position. Thus, with the driver the projection and therefore the pipe or the rod can be moved from the preferred position into a different position, thus tensioning the helical spring whereas release of the driver has the effect that the helical spring moves the projection and therefore the pipe or the rod but also the driver and therefore the slider back into a preferred position.

In a preferred embodiment the slider is a hollow cylindrical element, particularly preferably a sleeve-like element which is pushed on a tubular base body of the shaft.

In a preferred embodiment a latch pin spring is provided which is tensioned when the latch pin is moved from a preferred position into a different position. In a preferred embodiment a plurality of latch pins are provided which each have a latch pin holder. The latch pin holders are arranged radially around the longitudinal axis of the shaft, for example as part of an expanding cone. An O ring or a spring or a plurality of springs can be provided as the latch pin spring which is inserted in grooves on the latch pin holders. If the latch pin holders are moved towards the outside, the O ring/spring is expanded and the latch pin spring is accordingly tensioned. In the forceless state the O ring/spring pulls the latch pin holders radially back inwards. Other resilient elements such as, for example, a spring ring can also be provided as latch pin spring. Embodiments are also feasible in which, instead of the latch pin spring, magnetic force is used, for example, if the individual elements of an expanding cone are designed to that they attract one another.

In a preferred embodiment the coupling half of the holder can be moved translationally relative to the shaft. In this preferred embodiment the long-shaft tool creates the possibility of working with a manipulator which has a manipulation surface which by means of the engagement of the coupling halves of the holder and the manipulator, can be set in a rotational movement. On the other hand, the long-shaft tool thus designed provides the possibility of retracting the coupling halves and then working only with a manipulator held firmly in the holder without a movable manipulation surface.

In a preferred embodiment the coupling half of the holder is formed on the cone element.

In a preferred embodiment a latch bolt is provided which passes through an opening in the base body of the shaft and engages in a latch groove on the pipe or the rod. The latch groove can run in the circumferential direction. Thus, by engagement of the latch bolt in the latch groove, the translational position of the pipe or the rod relative to the base body can be fixed but at the same time a rotation of the pipe or rod relative to the base body remains possible. In an alternative embodiment, the latch groove can run in a direction parallel to the longitudinal axis. Thus, by engagement of the latch bolt in the latch groove the rotational position of the pipe or the rod relative to the base body can be fixed but at the same time a translational movement of the pipe or rod relative to the base body remains possible. Likewise it is feasible that the latch groove is a type of recess which brings about both a translational and a rotational fixing. The pipe or the rod can have a plurality of latch grooves. The latch grooves can be of the same type, i.e. for example all designed as circumferential grooves. However it is also feasible that the latch grooves are designed differently.

The manipulator of the long-shaft tool according to the invention can be designed differently. Rigid manipulators are feasible where a rigid manipulator is understood as an element in which all the surfaces of the element always have the same position with respect to one another. Such rigid manipulators can be pins, tips, scrapers, elements having screwdriver-like ends, hooks, rakes, hammers, head-like elements, axe-like elements, saw-like elements, knife-like elements with vertical blades, a mirror, a camera, a sensor, a lamp, a brush, a wrench, for example an open-jaw wrench.

Furthermore the manipulator can be a passively moving manipulator. In such a manipulator a manipulation surface is provided which can be moved relative to another element of the manipulator, preferably a mounting provided as part of the manipulator. Such a manipulator can, for example, comprise a disk-shaped knife which turns relative to a mounting, for example, is arranged on an axis which is mounted in the mounting. Other manipulators of this type can for example be rotatingly mounted brushes.

The manipulator can furthermore have an actively moving manipulation surface. By this is understood that the manipulation surface of the manipulator is moved by a movement of the coupling half of the holder which is transmitted into a movement of the coupling half of the manipulator from a first position into a second positive relative to a mounting formed on the manipulator. The movement can be a continuous movement, for example, a rotation about the longitudinal axis of the shaft or about an axis parallel to the longitudinal axis of the shaft. For example, the manipulation surface can be part of the surface of a drill. However, the actively produced movement can also be the movement from a first position into a second position of the manipulation surface which is then maintained during the manipulation. For example, the manipulation surface can be the surface of a first gripper which is delivered to a counter-surface by active movement so that an element to be held can be held between the gripping surface and the counter-surface. Likewise, the provision of two manipulation surfaces is feasible which are each provided on movable arms which can be delivered actively to one another. However, it is also feasible that the manipulation surface is the tip of a scraper or spatula which in a first position is arranged at a first angle to a mounting and is tilted into a second position by active movement. This can be used, for example, for processing situations in which in a first position the upper side of a pipe is to be scraped and in a second position the underside of a pipe is to be scraped, for which the scraper or spatula is preferably positioned contrary to the shaft, i.e. in the manner of a barb. In a preferred embodiment the manipulator has a coupling half which engages in a coupling half of the holder or into which the coupling half of the holder engages when the manipulator is received by the receptacle.

In a preferred embodiment the manipulator can comprise a transmission which converts the rotational movement of the coupling half about an axis of rotation into a rotational movement of the manipulation surface about a different axis of rotation. By means of such a transmission an offset of the axis of rotation parallel to the axis of rotation about which the coupling half rotates can be brought about. By using bevel gears, even the axis of rotation of the manipulation surface can be at an angle to the axis of rotation of the coupling half. Angular transmissions can also be used for this purpose. Transfer gearboxes can also be provided in which the rotation of the coupling half of the manipulator is converted into rotations of different elements about different axes which are usually parallel to one another. Likewise a transmission can convert the rotational movement into an axial movement. Thus, for example, a spindle can be provided which engages in a correspondingly configured toothed structure in a linearly guided carriage so that a rotation of the spindle brings about a movement of the carriage along its guide.

The system according to the invention comprises a long-shaft tool according to the invention with a first manipulator and a second manipulator, wherein in a first system state the first manipulator is received by the holder and in a second system state the second manipulator instead of the first manipulator is received by the holder.

In a preferred embodiment, the system has at least one rigid manipulator and at least one passively moving manipulator. In a preferred embodiment the system has at least one rigid manipulator and at least one actively moving manipulator. In a preferred embodiment the system has at least one actively moving manipulator and at least one passively moving manipulator. In a preferred embodiment the system has at least one rigid manipulator and at least one passively moving manipulator and at least one actively moving manipulator.

The tool according to the invention and the system according to the invention are preferably used for manipulating an object in a space through an opening which comprises an opening whose cross-section is so small that a person cannot pass through the opening, particularly preferably has a cross-section whose greatest extension is less than 1 m, particularly preferably less than 0.8 m and particularly preferably less than 0.5 m. Particularly preferably the tool according to the invention and the system according to the invention are preferably used for manipulating an object in a space through an opening which comprises a circular opening whose diameter is so small that a person cannot pass through the opening, particularly preferably has a diameter which is less than 1 m, particularly preferably less than 0.8 m and particularly preferably less than 0.7 m. The tool according to the invention and the system according to the invention are preferably used for processing a pipeline located in a trench from the ground surface. The processing can include the cleaning of the pipeline from outside, i.e. for example the removal of earth adhering to the pipeline. The processing of the pipeline can also include the adjustment of valves on the pipeline, for example by turning a valve wheel or by turning a slot into which a screwdriver-like element is inserted in order to adjust the valve or for example, by turning a square. The processing of the pipeline can also include the application of paint. The processing of the pipeline can also include the severing of the pipeline. The processing of the pipeline can further comprise removal of an oxide layer,
    beveling of a pipe end,
    marking or drawing on a pipe,
    manipulating a pipe in the sense of turning or pushing the pipe,
    producing a plug connection, for example, a plug connection for the electrical welding of two pipe ends,
    producing a potential compensation, in particular in the form of attaching a first clip to a first pipe section and attaching a second clip connected by a cable to the first clip on a second pipe section,
    attachment of fittings,
    drilling out and/or
    producing a weld connection.

The above statements and the following description of exemplary embodiments do not rule out specific embodiments or features.

BRIEF DESCRIPTION OF THE DRAWINGS

The invention will be explained in detail hereinafter with reference to drawings showing merely exemplary embodiments of the invention. In the figures:

FIG. 4 shows a perspective view of the second end of the shaft with the latch pins in the retracted position;

FIG. 5 shows a perspective view of the second end of the shaft with the latch pins in the protruding position;

FIG. 10 shows a second further development of the first design shown in FIG. 7 in a perspective view in a first position;

FIG. 11 shows a second further development of the first design shown in FIG. 7 in a perspective view in a second position;

FIG. 17 shows a perspective view of a fifth design of a manipulator in a first state;

FIG. 18 shows a perspective view of a fifth design according to FIG. 17 in a second state;

FIG. 20 shows a perspective view of a third design of a manipulator in a first state.

DETAILED DESCRIPTION

Figure 1:
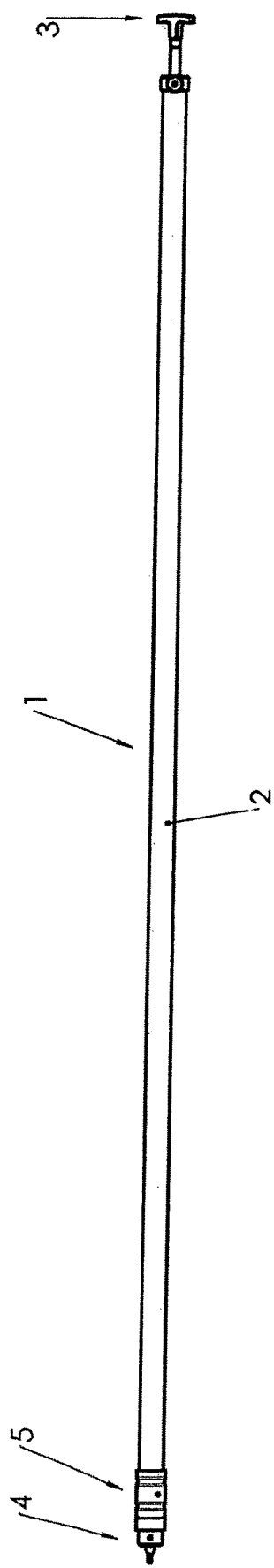
FIG. 1 shows a side view of the shaft of the long-shaft tool according to the invention.

FIG. 1 shows a side view of the shaft 1 of the long-shaft tool according to the invention. The shaft 1 has a tubular base body 2 which is made from a carbon fiber composite material. A handle 3 in the form of a T piece (cf. FIG. 6) is provided at a first end of the shaft 1. At the second end of the shaft 1 opposite the first end, a holder 4 is provided for a manipulator 6. Adjacent to the holder 4 another handle is provided in the form of a hollow cylindrical sleeve 5.

Figure 2:
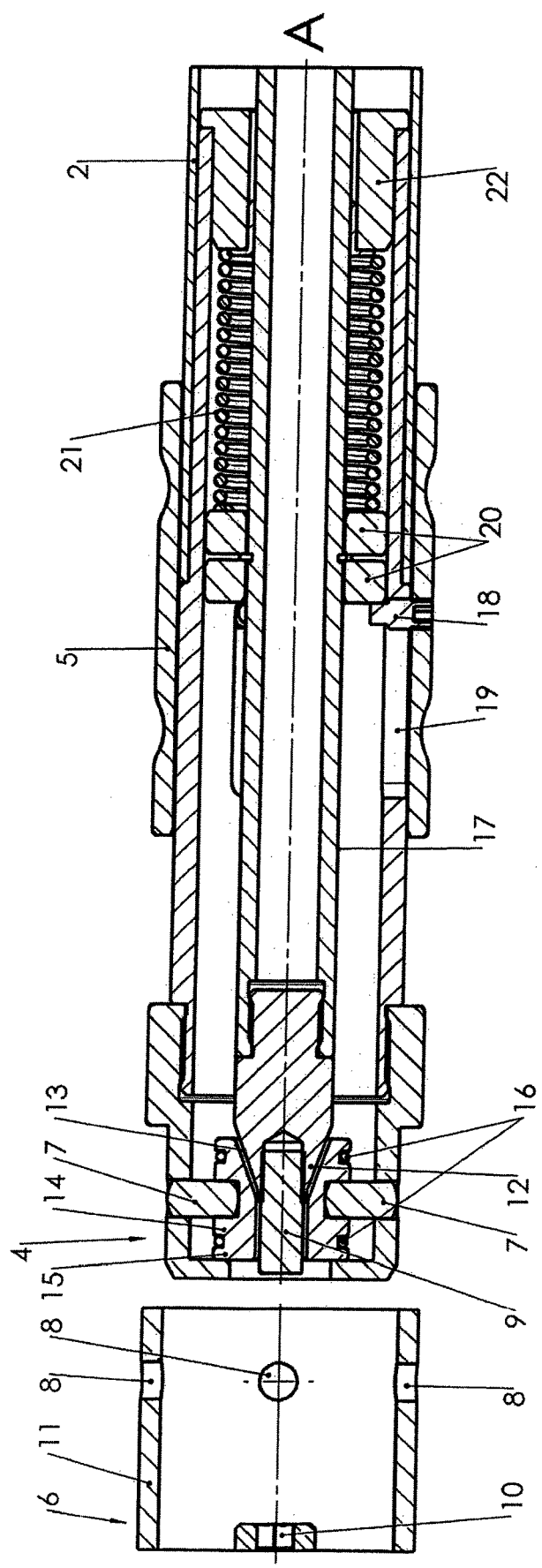
FIG. 2 shows a cutaway view of the second end of the shaft of the tool according to FIG. 1 with a manipulator spaced apart from the holder.
Figure 3:
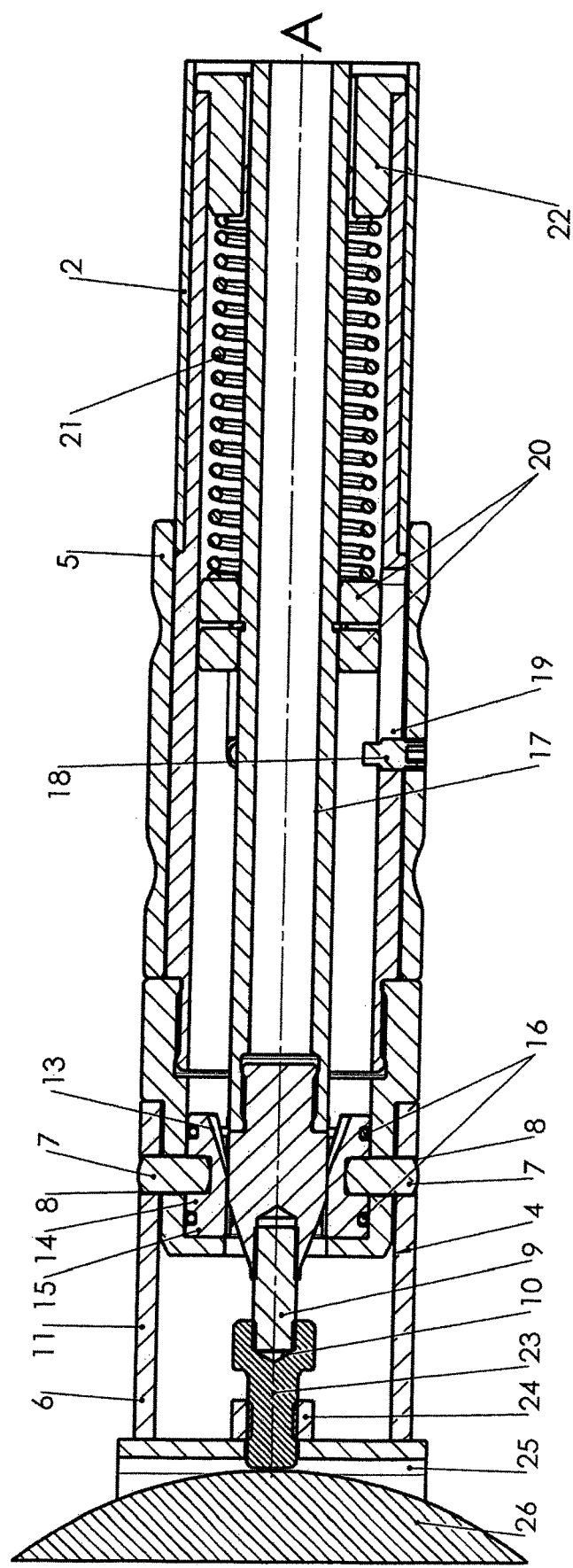
FIG. 3 shows a cutaway view of the second end of the shaft of the tool according to FIG. 1 with parts of a manipulator received by the holder.

FIG. 2 shows a cutaway view of the second end of the shaft 1 of the tool with a partially depicted manipulator 6 which, in the view of FIG. 2, is spaced apart from the holder 4 and in the view of FIG. 3 is shown in the position in which it was received by the holder 4.

FIGS. 2 and 3 show that the holder has latch pins 7. In the position shown in FIG. 3 with manipulator 6 received by the holder 4 the latch pins 7 protrude and engage in recesses 8 of the manipulator. As can be seen from a comparison of FIGS. 2 and 3, the latch pins 7 can be moved from the protruding position (cf. FIG. 3) into a retracted position (cf. FIG. 2).

The holder 4 further has a coupling half 9 in the form of a hexagon which is provided for coupling to a coupling half 10 of the manipulator 6. The coupling half 10 of the manipulator 6 has a hexagonal recess. The coupling half 9 of the holder 4 is rotatable relative to the base body 2 of the shaft 1.

In the embodiments shown in FIGS. 1 to 19, the holder 4 is designed as a cylindrical section of the shaft 1 and is configured to cooperate with a hollow cylindrical section 11 (hereinafter also called mounting 11) of the manipulator 6 in which the recesses 8 are provided. In the embodiments shown here the manipulator 6 is thus pushed onto the holder 4, where the hollow cylindrical mounting 11 surrounds the holder 4. It is apparent that other embodiments are also feasible, namely those in which the hollow cylindrical section 11 is provided on the sides of the holder 4 and the manipulator 6 has a corresponding projection which is inserted in the hollow cylindrical section 11.

As a comparison of FIGS. 2 and 3 shows, the latch pins 7 are moved radially in relation to the longitudinal axis A of the shaft 1 to adopt the retracted position. A cone element 12 is provided whose cone surface 13 can be brought in contact with a latch pin holder 14 which is designed as part of an expanding cone 15 where the latch pin holder 14 receives an end of the respective latch pin 7. A sliding of the latch pin holder 14 along the cone surface 13 of the cone element 12 brings about a change in the radial position of the latch pins 7 relative to the longitudinal axis A. A latch pin spring is provided in the form of two O rings 16 which is tensioned when the cone element is moved from a preferred position as shown in FIG. 2 into another position as shown in FIG. 3. The translational movement of the cone element 12 along the longitudinal axis A has the effect that the expanding cone 15 is spread apart and the latch pin holders 14 are moved radially outwards. The O rings 16 lying in grooves of the latch pin holders 14 are thereby tensioned.

The cone element 12 is provided on a pipe 17 which is located in the base body 2 of the shaft 1. The pipe 17 can be moved both translationally, namely in the direction of the longitudinal axis A relative to the base body 2 of the shaft 1 and also rotationally about the longitudinal axis A. By means of the translational movement, the spreading of the expanding cone 15 and thus the displacement of the latch pins 7 from a protruding position into a retracted position can be brought about. With the rotational movement the coupling half 9 provided on the front end of the cone element 12 can be turned relative to the base body 2 of the shaft 1 about the longitudinal axis A. When the coupling halves 9 and 10 intermesh, this rotational movement is also transmitted to the coupling half 10 of the manipulator 6. The cone element 12 is adjoined at the broader end of the cone element 13 by a cylindrical section which allows an axial movement of the pipe 17 relative to the latch pins 7 without these changing their radial position.

FIGS. 2 and 3 show the action of the second handle which is formed by the hollow cylindrical sleeve 5. FIG. 2 shows the sleeve 5 in a retracted position. FIG. 3 shows the sleeve 5 in its front position. A driver 18 is provided on the sleeve 5 which is guided in an elongate hole 19 in the base body 2 of the shaft 1. The elongate hole 19 in cooperation with the driver 18 allows a translational movement of the sleeve 5 relative to the longitudinal axis A of the shaft 1, but at the same time limits this movement by impact of the driver 18 on the respective end of the elongate hole 19. As a comparison of FIG. 3 (no contact) with FIG. 2 shows (contact), the driver 18 can be brought in contact with a projection 20 by the translational movement of the sleeve 5 along the longitudinal axis A.

The projection 20 is provided on the outer surface of the pipe 17 and is formed by two disks which are firmly connected to the outer surface of the pipe 17. As shown in FIG. 3, the projection 20 has a preferred position. It adopts this preferred position as a result of a cone element spring 21. The cone element spring 21 abuts with a first end against the opposite side of the projection 20. With a second end, the cone element spring 21 abuts against a stop 22 which is formed inwards from the inner surface of the tubular base body 2. As a result, the cone element spring 21 is effective between a rigid fixed point on the base body 2 (stop 22) and a fixed point on the pipe 17 (projection 20) and influences the relative position of the pipe 17 relative to the base body 2. In this case, the preferred position of the pipe 17 is the advanced position shown in FIG. 3. This has the result that the latch pins 7 are located in the preferred position of the pipe 17 in the protruding position shown in FIG. 3. This ensures that without the action of external forces which, for example, withdraw the pipe 17 against the cone element spring 21 from the preferred position, the latch pins 7 are always in the protruding position and therefore in engagement with the recesses 8 of the manipulator 6. Thus, the preferred position is that in which the manipulator 6 is securely connected to the shaft 1. This simplifies the handling with the long-shaft tool according to the invention.

As a comparison of FIG. 2 with FIG. 3 shows, the driver 18 comes in contact with the projection 20 when it is moved by a withdrawal of the sleeve 5 along the elongate hole 19. FIG. 3 shows that in the preferred position the projection 20 is disposed approximately at the center of the section which the driver 18 can cover from one end of the elongate hole 18 to the opposite end. Since the driver 18 is moved further after it has come in contact with the projection 20, it pushes the projection 20 and thus the pipe 17 along the longitudinal axis A. In this case, the spring 21 is compressed, the coupling half 9 is drawn into the holder 4 and the latch pins 7 are pulled inwards by the action of the latch pin spring 16 as shown in FIG. 2 which shows the end position of the driver 18 in the elongate hole 19.

The provision of the sleeve 5 adjacent to the holder 4 affords the advantage that the shaft 1 can easily be connected to the manipulator 6. The second end of the shaft 1 can be gripped and the withdrawal of the latch pins 7 can be accomplished by a movement of the sleeve 5 at the second end of the shaft 1. The holder 4 can be guided in the mounting 11 of the manipulator 6 by handling the shaft 1 at the second end. This is particularly advantageous for particularly long base bodies 2 of the shaft 1.

FIG. 3 shows the manipulator 6 in the situation in which it is received by the holder 4. Here FIG. 3 shows that the coupling half 9 of the holder 4 engages in the coupling half 10 of the manipulator 6. FIG. 3 shows a first embodiment of a manipulator 6. In this embodiment the coupling half 10 of the manipulator 6 is executed on a screw 23 which is executed in a thread 24 of a rigid part 25 of the manipulator 6. By turning the pipe 17 and therefore the coupling half 9 of the holder 4, the coupling half 10 of the manipulator 6 can be turned and the position of the screw 23 inside the thread 24 can thus be changed. This change in position can be used for clamping a disk 26 shown in part in FIG. 3. The disk 26 (cf. FIGS. 7 to 10) is rotatably mounted in the fixed part 25 of the manipulator 6. When the screw 23 is delivered to the disk 26, it can fix the rotational position of the disk 26 relative to the fixed part 25 of the manipulator 6. When the screw 23 is unscrewed, it releases the disk 26. The adjustment of the relative position of the disk 26 relative to the fixed part 25 of the manipulator 6 thereby made possible can be used to adjust the position of tools relative to the fixed part 25 of the manipulator 6 and therefore also relative to the shaft 1 as will be explained in detail in the context of FIGS. 7 to 10.

FIGS. 4 and 5 show in perspective view the second end of the shaft with latch pins in the retracted position (FIG. 4) and in the protruding position (FIG. 5). In the comparison of FIG. 4 with FIG. 5, the sleeve 5 can also be seen in its retracted position, i.e. the position comparable to that shown in FIG. 2, and its advanced position (the position comparable to view in FIG. 3). It can further be seen that as a result of displacement of the sleeve 5, the cone part 12 carried by the pipe 17 moves from a retracted position (FIG. 4) into an advanced preferred position (FIG. 5). As a result, the coupling half 9 of the holder 4 also moves into an advanced position in which it can engage with a coupling half 10 of the manipulator 6. It can further be seen how as a result of the displacement of the pipe 17 and the associated cone element 12, the latch pins 7 can be displaced from the retracted position (FIG. 4) into the protruding position (FIG. 5).

Figure 6:
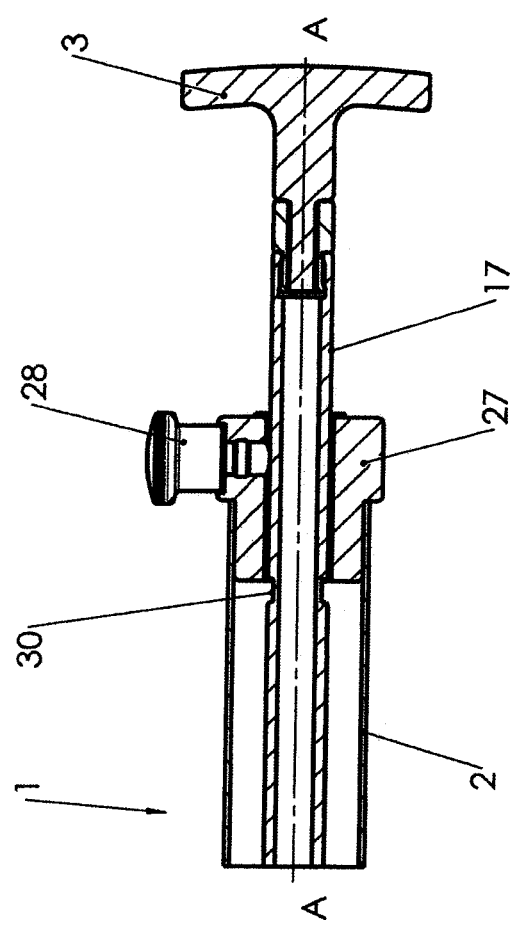
FIG. 6 shows a cutaway view of the first end of the shaft.

FIG. 6 shows the first end of the shaft 1. Shown there is the base body 2 of the shaft 1 which extends from the first end shown in FIG. 6 as far as the second end of the shaft 1 shown in FIGS. 2 and 3. One end of the pipe 17 is also shown. The pipe 17 extends from the first end of the shaft 1 shown in FIG. 6 to the second end of the shaft 1 shown in FIGS. 2 and 3. At the first end of the base body 2 a guide 27 for the pipe 17 is provided in the form of an end cap with central through hole.

FIG. 6 further shows that the handle 3 is arranged in the form of a T piece at the end of the pipe 17. Finally FIG. 6 shows a latch bolt 28 which can engage in a latch groove 30. The relative position of the pipe 17 relative to the base body 2 can thus be fixed in the direction of the longitudinal axis A. The latch groove 30 can be configured circumferentially so that an engagement of the latch bolt 28 in the latch groove 30 can be accomplished independently of the respective rotational position of the pipe 17 relative to the latch bolt 28. In addition, the provision of a circumferential latch groove allows the pipe 17 to be turned relative to the base body 2 despite the latch bolt 28 engaging in the latch groove 30 so that the coupling half 9 of the holder 4 can be turned relative to the base body 2.

Figure 7:
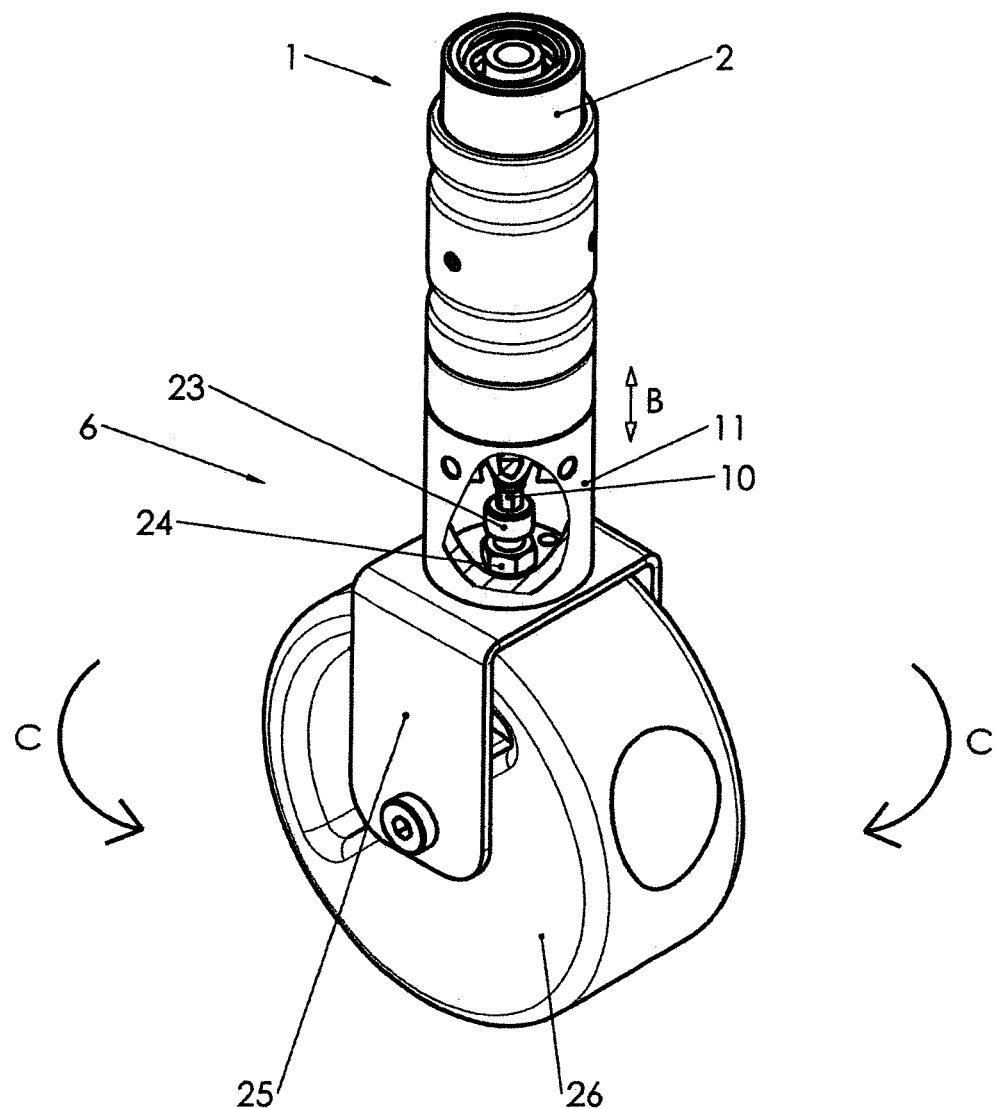
FIG. 7 shows a first design of a manipulator in a perspective view.

FIG. 7 shows a first embodiment of a manipulator whose hollow cylindrical section 11 is pushed onto the holder 4 of a shaft 1. The embodiment of the manipulator 6 as depicted partially in FIG. 3 is shown. The manipulator 6 has a fixed part 25. A disk 26 is rotatably mounted in the fixed part 25. Furthermore a thread sleeve 24 is firmly provided in the fixed part 25. A screw 23 on which the coupling half 10 of the manipulator 6 is executed, is pushed in the thread sleeve 24. By turning the screw 23 in and out, the position of the screw 23 is changed in the direction of the double arrow B. Depending on the position of the screw 23 relative to the disk 26, this is released for rotation in the direction of the arrow C or prevented from rotation by the interaction of the tip of the screw 23 with the outer surface of the disk 26.

Figure 9:
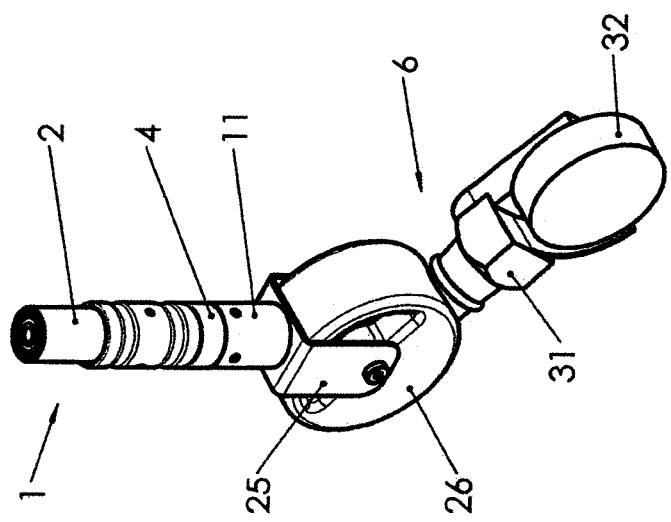
FIG. 9 shows a first further development of the first design shown in FIG. 7 in a perspective view in a second position.
Figure 8:
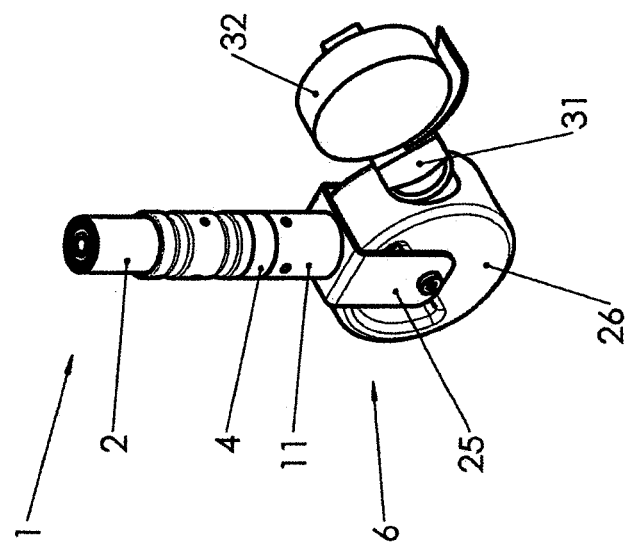
FIG. 8 shows a first further development of the first design shown in FIG. 7 in a perspective view in a first position.

FIGS. 8 and 9 show a first further development of the first design of a manipulator 6 shown in FIG. 7. In this first further development a disk-shaped brush 32 is held on the disk 26 via a mounting 31. The disk-shaped brush 32 can rotate about an axis of rotation which is held by the mounting 31. As can be seen from a comparison of FIGS. 8 and 9, the alignment of the brush 32 can be changed by the previously described adjustment of the relative position of the disk 26 relative to the fixed part 25 of the manipulator 6. The alignment shown in FIG. 8 can be used, for example to clean a pipe from below, for example, to brush off earth caked onto the underside of the pipe. The alignment of the brush 32 shown in FIG. 9 can be used, for example, to remove earth caked onto the upper side of a pipe. The mounting 32 can in this case comprise a rotational drive (not shown in detail) for the brush 32, for example, a pneumatic drive.

FIGS. 10 and 11 show—in comparable views to those of FIGS. 8 and 9—a second further development of the first design of a manipulator 6 shown in FIG. 7. In the further development shown in FIGS. 10 and 11, not a brush but a chisel 33 is provided on the disk 26. When FIGS. 10 and 11 are compared, it is again shown how the previously described possibility of fixing different positions of the disk 26 relative to the fixed part 25 can be used to change the alignment of the chisel 33 in order to thus enable, for example, processing of a pipe from below (FIG. 10) and from above (FIG. 11). The mounting 31 can have a linear drive (not shown) or impact drive for the chisel 33, for example a pneumatic drive.

Figure 12:
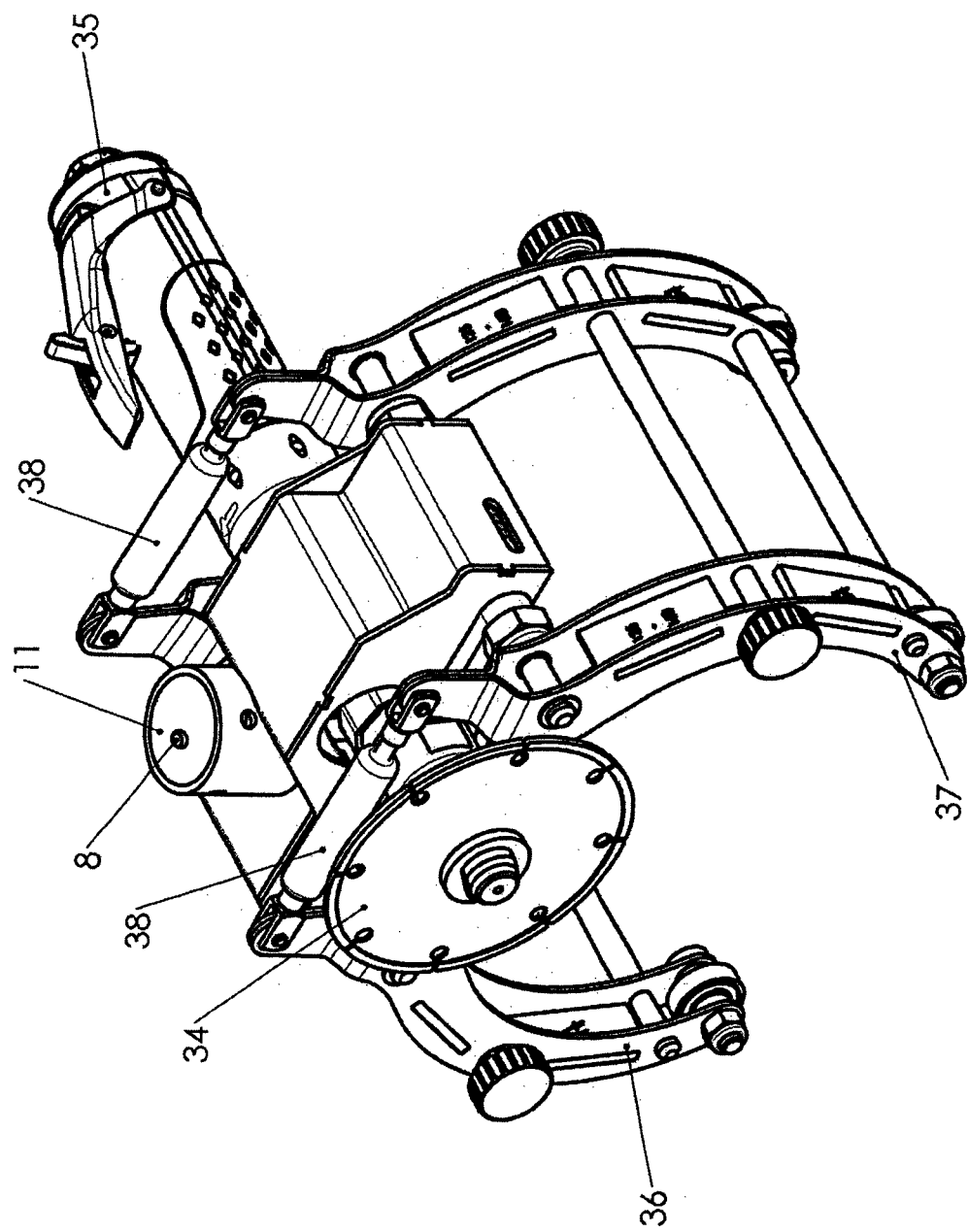
FIG. 12 shows a perspective view of a second design of a manipulator in a first state.
Figure 13:
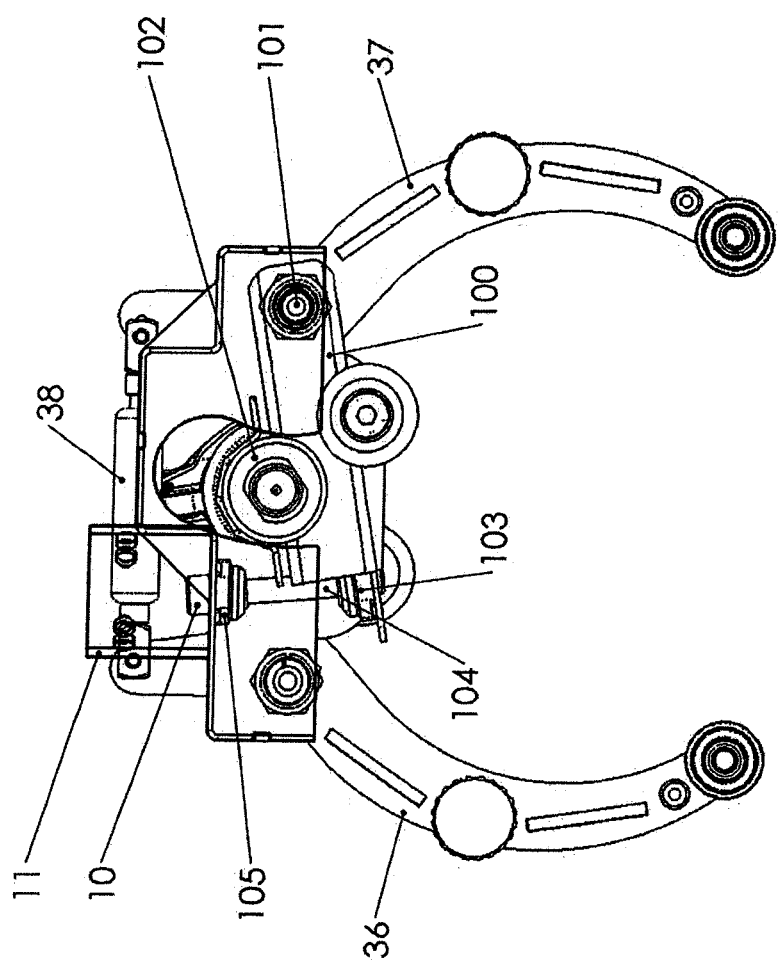
FIG. 13 shows a perspective partial view of the second design according to FIG. 12 with separating disc removed.

FIG. 12 shows a second design of a manipulator in perspective views.

The manipulator 6 shown in FIG. 12 is a cutting tool. It has a disk-shaped cutting edge 34 and a drive 35 which can rotatingly drive the cutting edge 34. The manipulator [has] jaws 36, 37 which are pre-tensioned by means of gas compression springs 38 into the position shown in FIGS. 12 and 13 and which from this position by splaying of the jaws 36, 37 against the pre-tensioning force of the gas compression springs 38, can grip a pipe having a larger diameter than that shown between the jaws in the diagram of FIG. 12, and can be firmly clamped on this pipe.

The cutting edge 34 can be delivered to the pipe by means of a rotation of the coupling half 10 of the mounting 11. For this purpose a rocker 100 is provided on the coupling half 10 which is mounted at a fixed pivot point 101. The holder 102 for the cutting edge is provided on the rocker 100. The cutting edge 34 is not shown in the diagram in FIG. 13 in order to improve the view of the rocker 100. At the end opposite the pivot point 101, the rocker 100 has a spherical bearing 103 in which a bolt 104 with a thread engages. The bolt 104 passes through a spherical bearing 105 with a through hole. The head of the bolt 104 forms the coupling half 10 of the mounting 11. A rotation of the coupling half 10 causes a rotation of the bolt 104 and thus a change in the distance of the spherical bearing 103 with respect to the coupling half 10. Due to the change in this distance, the rocker 100 is pivoted about the pivot point 101 and thus the position of the cutting edge 34 carried by the holder 102 changes relative to the pipe (not shown).

Figure 15:
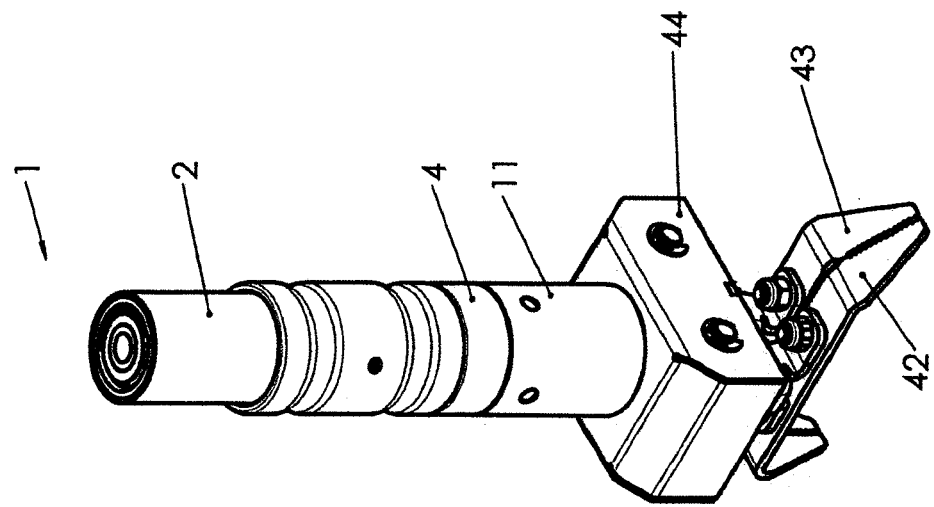
FIG. 15 shows a perspective view of the fourth design according to FIG. 14 in a second state.
Figure 14:
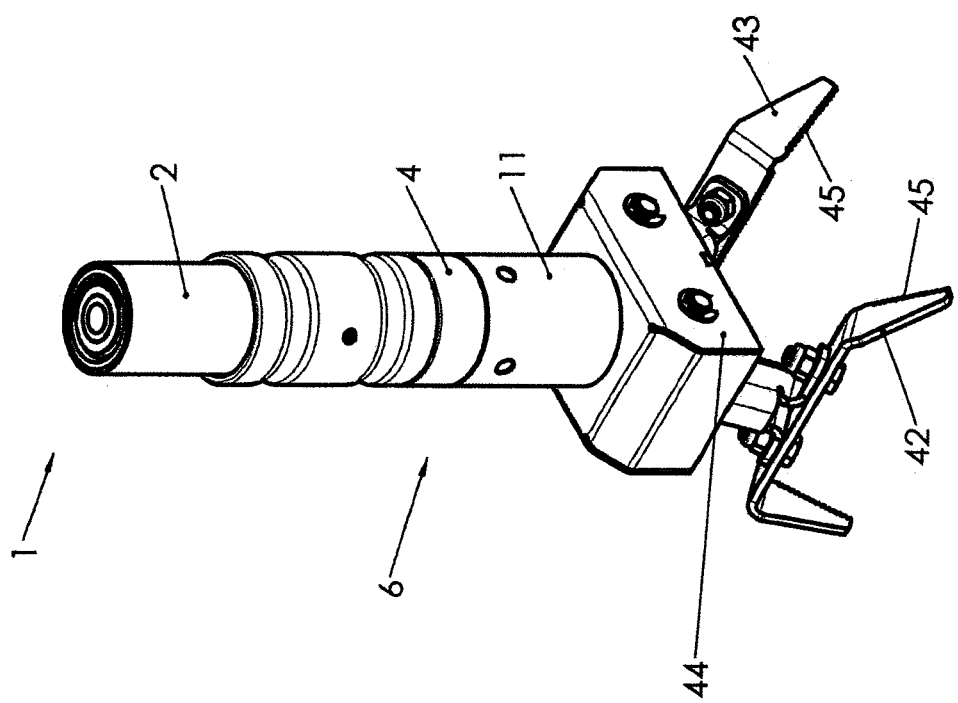
FIG. 14 shows a perspective view of a fourth design of a manipulator in a first state.
Figure 16:
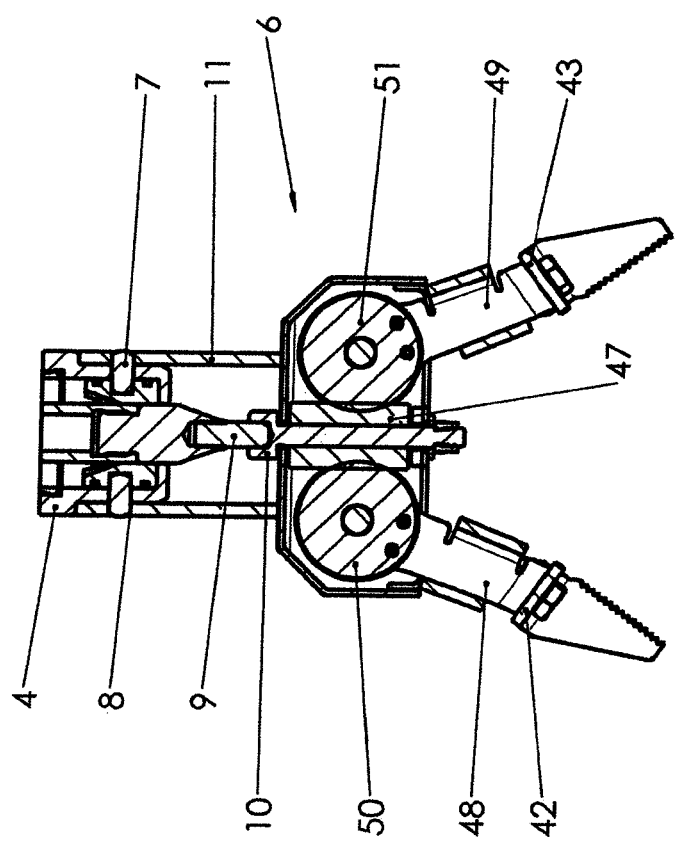
FIG. 16 shows a partially transparent perspective view of the fourth design according to FIG. 14.

FIGS. 14, 15 and 16 show a fourth design of a manipulator 6. This design serves as a gripper. The manipulator 6 has two oppositely arranged gripping jaws 42, 43. These are mounted pivotably in a fixed part 44 of the manipulator 6. FIG. 14 shows the gripping jaws 42, 43 in an open position and FIG. 15 shows the gripping jaws 42, 43 in the closed position. In particular it can be deduced from FIG. 14 that the gripping jaws 42, 43 can be configured for particular functions. In the front part of the gripping jaws a sawtooth profile 45 or a cutting edge can be provided. In the rear part of the jaws 42, 43 semicircular recesses can be provided alternatively or additionally which form a substantially round hole upon closing the jaws 42 and 43.

The partially transparent view in FIG. 16 shows that the coupling half 10 of the manipulator 6 is connected to a roller 47 of a worm gear. The jaws 42, 43 are connected to arms 48, 49 which have worm wheels 50, 51 at their ends which can cooperate with the roller 47. It can be seen that through a rotation of the pipe 17 and therefore the coupling half 9 of the holder 4, a rotation of the coupling half 10 of the manipulator 6 can be brought about by the intermeshing of the coupling halves 9 and 10. The rotation of the coupling half 10 of the manipulator 6 leads to a rotation of the roller 47 which brings about a delivery movement of the jaws 42, 43 towards one another via the worm gear formed thereby with the worm wheels 50, 51. The relative position of the jaws 42, 43 can thus be adjusted with respect to one another by the angle of rotation through which the pipe 17 is turned, The jaws 42, 43 can be exchangeable elements which are connected to an angular extension of the respective arm 48, 49 with the aid of the screws shown in FIGS. 14 to 16.

Figure 19:
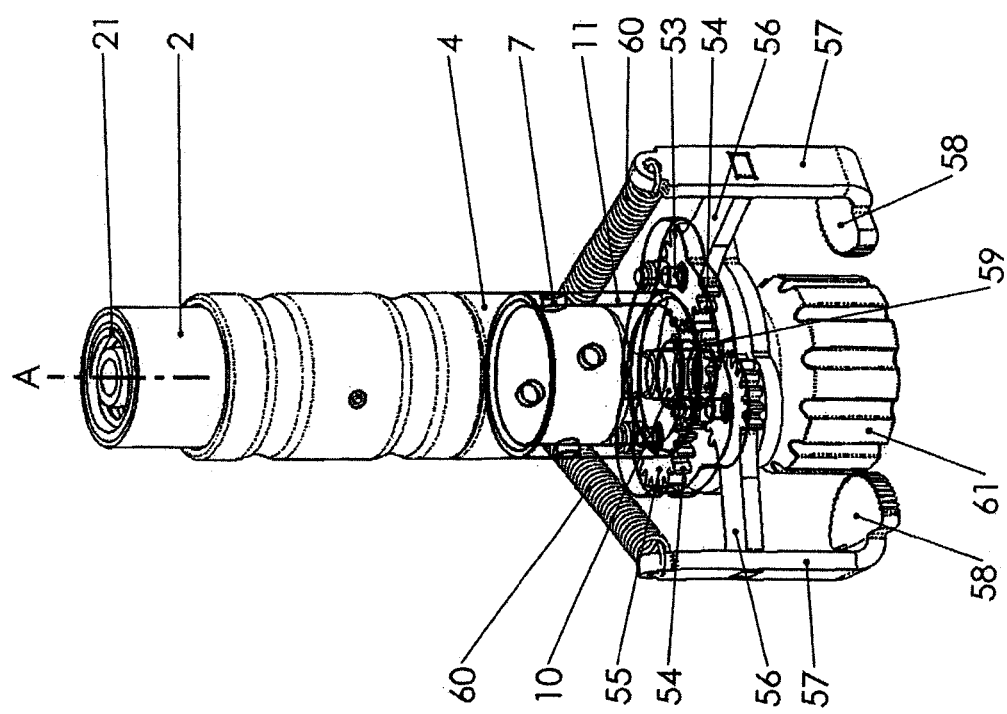
FIG. 19 shows a partially transparent perspective view of the fifth design according to FIG. 17

FIGS. 17, 18 and 19 show a fifth embodiment of a manipulator 6. This has a fixed part 52. Three axes 53 are provided on this fixed part 52 which each pass through a bore of a head 55 of an arm 56 having a toothed structure 54. A gripper arm 57 running at right angles to the arm 56 is connected in each case to a gripper head 58 on the arm 56. The toothed structure 54 of the heads 55 engages in a toothed structure 59 which is connected via a shaft to the coupling half 10 of the manipulator 6. A rotation of the coupling half 10 about the longitudinal axis A thus brings about a rotation of the toothed structure 59 about the axis A. As a comparison of FIGS. 17 and 18 shows, a rotation of the toothed structure 59 about the longitudinal axis A leads to a turning of the arms 56 about the axis 53. As a result, the relative position of the gripper heads 58 can be changed in relation to the longitudinal axis A. With approximately radially running arms 56 the gripper heads 58 are at a greater distance from the longitudinal axis A (cf. FIG. 17) than in angular positions of the arms 56 which do not run radially to the longitudinal axis A (cf. FIG. 18). Thus, the fourth design of the manipulator 6 can be used as a gripper to grip and turn closure caps such as the closure cap 61 shown as an example in FIGS. 17 to 19.

The alignment of the gripper heads 58 can also be changed so that in a first position a cap can be released and in another position the cap can be tightened. To this end the gripper heads in a state in which the manipulator is held at a distance from the closure cap 61 are brought from the alignment pointing clockwise shown in FIG. 18 into an alignment pointing anticlockwise by turning the coupling halves 10 and the pivoting movement of the arms 56 thereby effected beyond the dead point shown in FIG. 17.

FIGS. 17 to 19 show springs 60 which pretension the upper ends of the gripper arms 57 in the direction of the longitudinal axis A and thereby give preference to the state shown in FIG. 18 relative to the state shown in FIG. 17.

FIGS. 17 to 19 show embodiments of the shaft 1 without a second handle arranged adjacent to the holder 4, configured as sleeve 5.

In the embodiment shown in FIG. 20 the rotation of the coupling half (not shown) in the mounting 11 of the manipulator results in a rotation of a spindle 62 shown only schematically. This cooperates with a toothed structure in a carriage 63. The carriage 63 is guided in a linear guide 64 so that a rotation of the spindle 62 is converted into a linear movement of the carriage 63 along the linear guide 64. A linear delivery movement of a cutting blade 65 connected to the carriage can thus be achieved.

The invention claimed is:

1. A long-shaft tool comprising:
a shaft including a base body extending along a longitudinal axis;
a first handle at a first end of the base body movable independent of the base body; and
a manipulator holder at a second end of the base body opposite the first end, said manipulator holder including:
a movable latch pin configured to be moved to one of (i) a protruding position wherein the latch pin protrudes from the manipulator holder to engage a recess of a manipulator placed in the manipulator holder, and (ii) a retracted position wherein the latch pin is retracted from the recess of the manipulator in the manipulator holder;
a tool coupling configured to engage a manipulator coupling when the manipulator is placed in the manipulator holder; and
an element configured to contact one of: (a) an end of the latch pin or (b) a latch pin holder configured to receive the latch pin;
wherein a surface of the element is configured to be interacted with by the end of the latch pin, or by the latch pin holder, when present, to change a radial position of the latch pin relative to the longitudinal axis to adopt one of the retracted or the protruding positions; and
wherein the first handle is movable by a user to manipulate the tool coupling, wherein manipulation of the tool coupling manipulates the manipulator coupling to cause a change in translational position, a change in rotational position, or both a change in the translational position and the rotational position, of the manipulator placed in the manipulator holder independent of movement of the latch pin between the protruding position and the retracted position.

2. The long-shaft tool according to claim 1, wherein the element comprises a cone element including a cone surface configured to contact the end of the latch pin or the latch pin holder; and
wherein the surface of the element being configured to be interacted with by the end of the latch pin or by the latch pin holder comprises the end of the movable latch pin or the latch pin holder being configured to slide along the cone surface to change the radial position of the latch pin relative to the longitudinal axis to adopt one of the retracted or the protruding positions.

3. The long-shaft tool according to claim 2, wherein the manipulator holder further comprises a cone element spring coupled to the cone element, said cone element spring configured to compress and contract based upon movement of the cone element.

4. The long-shaft tool according to claim 2, wherein the shaft further comprises one of a pipe or a rod disposed longitudinally within the base body, and a first end of the cone element is attached to a first end of the one of the pipe and the rod.

5. The long-shaft tool according to claim 4, wherein the first handle at the first end of the base body is attached to a second end of the one of the pipe or the rod disposed longitudinally within the base body and configured to facilitate translational and rotational movement of the one of the pipe or the rod in relation to the base body by manipulation of the first handle.

6. The long-shaft tool according to claim 4, further comprising a second handle at the second end of the base body, wherein said second handle is coupled to the one of the pipe or the rod and configured to facilitate translational and rotational movement of the one of the pipe or the rod in relation to the base body by manipulation of the second handle.

7. The long-shaft tool according to claim 2, wherein the tool coupling is attached to a second end of the cone element.

8. The long-shaft tool according to claim 1, wherein the element comprises a cone element including a cone surface; and
wherein the manipulator holder comprises the latch pin holder configured to receive the end of the latch pin, wherein the latch pin holder is configured to slide along the cone surface to change a radial position of the latch pin relative to the longitudinal axis to adopt one of the retracted or the protruding positions.

9. The long-shaft tool according to claim 1, wherein the tool coupling is further configured to rotate relative to the base body when the manipulator is placed in the manipulator holder and the tool coupling engages the manipulator coupling.

10. The long-shaft tool according to claim 1, wherein the recess of the manipulator comprises at least one cylindrical passage through a wall of a hollow cylindrical mounting section of the manipulator.

11. The long-shaft tool according to claim 1, wherein the latch pin is tensioned to be pulled radially inwards.

12. A system comprising:
a long-shaft tool comprising:
a shaft including a base body extending along a longitudinal axis;
a first handle at a first end of the base body movable independent of the base body;
a manipulator holder at a second end of the base body opposite the first end, said manipulator holder including:
a movable latch pin configured to be moved to one of a (i) protruding position which causes the latch pin to protrude to engage a recess of a manipulator placed in the manipulator holder, and (ii) a retracted position which causes the latch pin to retract from the recess of the manipulator in the manipulator holder; and
a tool coupling configured to engage a manipulator coupling when the manipulator is placed in the manipulator holder;
an element configured to contact one of: (a) an end of the latch pin or (b) a latch pin holder configured to receive the latch pin;
wherein a surface of the element is configured to be interacted with by the end of the latch pin, or by the latch pin holder, when present, to change a radial position of the latch pin relative to the longitudinal axis to adopt one of the retracted or the protruding positions; and
a first manipulator including a first manipulator coupling configured to engage the tool coupling when the first manipulator is placed in the manipulator holder of the long-shaft tool;
wherein the first handle is movable by a user to manipulate the tool coupling, wherein manipulation of the tool coupling manipulates the first manipulator coupling to cause a change in translational position, a change in rotational position, or both a change in the translational position and the rotational position, of the first manipulator placed in the manipulator holder independent of movement of the latch pin between the protruding position and the retracted position.

13. The system of claim 12, further comprising a second manipulator including a second manipulator coupling configured to engage the tool coupling when the second manipulator is placed in the manipulator holder of the long-shaft tool.

14. The system of claim 13, wherein in a first system state the first manipulator is received by the tool holder and in a second system state the second manipulator is received by the tool holder rather than the first manipulator.

15. The system of claim 12, wherein the long-shaft tool and the first manipulator are configured to process a pipeline located in a trench from a ground surface proximate to the trench.

* * * * *